W. R. GRAVES.
GUANO DISTRIBUTER.
APPLICATION FILED MAY 3, 1911.
1,001,197.
Patented Aug. 22, 1911.
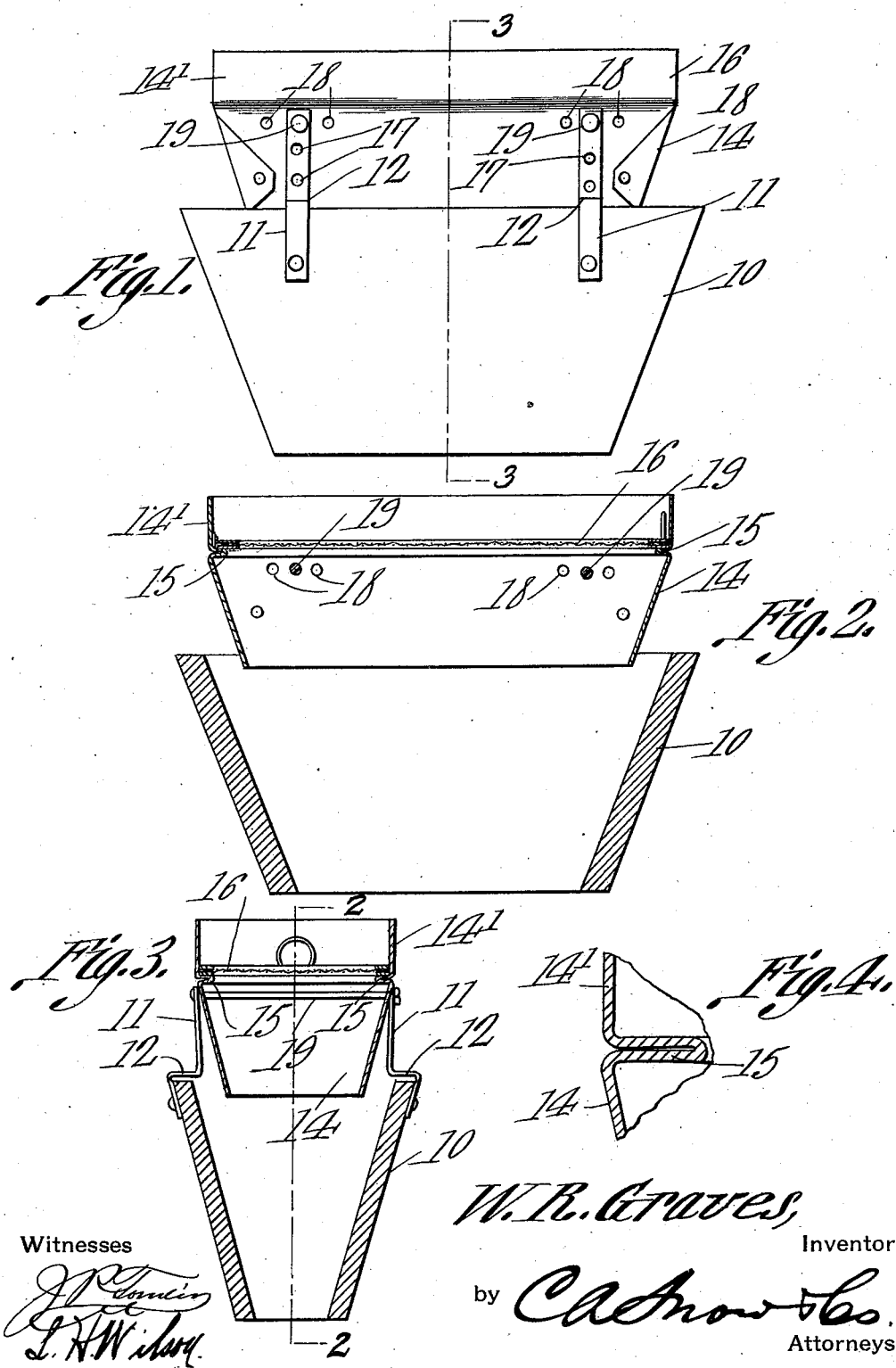

UNITED STATES PATENT OFFICE.

WALTER RANSOM GRAVES, OF WELLINGTON, ALABAMA.

GUANO-DISTRIBUTER.

1,001,197.  Specification of Letters Patent.  Patented Aug. 22, 1911.

Application filed May 3, 1911. Serial No. 624,704.

*To all whom it may concern:*

Be it known that I, WALTER R. GRAVES, a citizen of the United States, residing at Wellington, in the county of Calhoun and State of Alabama, have invented a new and useful Guano-Distributer, of which the following is a specification.

This invention relates to an improvement in fertilizer distributers.

The primary object of said invention is to provide a distributing device which in the distribution of fertilizer, will properly sift the same before it is fed to the main discharge hopper, thus effectually preventing the obstructing of said hopper which normally occurs when the guano or other fertilizer is deposited in the same without being sifted.

In the drawings:—Figure 1 is a side elevation of the device supported above the usual form of hopper. Fig. 2 is a longitudinal sectional view taken on the line 2—2 of Fig. 3. Fig. 3 is a transverse section taken on the line 3—3 of Fig. 1, and Fig. 4 is a detail view showing the manner of forming the screen supporting flange.

In the drawings, 10 designates the ordinary type of hopper which may be of any preferred construction the end walls of said hopper being tapered inwardly. Pivotally secured to the side walls of said hopper are a plurality of supporting arms 11, which arms are bent at the point 12 to lie parallel with the upper edge of the hopper sides, it being noted that said arms are bent at a point sufficiently above the edge of the side walls as to permit the supporting arms to swing on their pivots. Supported by said arms is a second hopper 14 which is of substantially the same configuration as the lower hopper. This upper hopper 14 is formed of a single piece of sheet metal, being formed with the tapered side and end walls, the upper portion or receiving end of the hopper being formed with the straight wall 14'. At the point where the straight wall meets the body of the hopper, the hopper is pressed inwardly as shown in Fig. 2 to form the interiorly arranged flange 15 on which is supported a screen or riddle 16, this screen being hingedly connected to one of the end walls of the hopper, the screen thus being readily lifted in order to remove the coarser particles.

The hoppers are rocked in any suitable manner, and the fertilizer distributed upon the screen 16 in any convenient manner, the rocking of the hoppers effectually sifting the same and allowing the fine particles to descend into the lower hopper 10 from whence they are distributed to the ground. Attention is called to the fact that by raising and lowering the hopper 14 with respect to the lower hopper 10, its longitudinal movement will be increased or diminished. Each of the supports 11 are provided adjacent their ends which are secured to the hopper 14 with a plurality of apertures 17, the hopper 14 also being provided with apertures 18.
A rod 19 extends through the apertures in the members 11, entirely through the hopper passing through the apertures on the other side of the hopper and extending through the apertures in the corresponding arm arranged on said other side. It will be seen that the hopper 14 is thus adjustable and when it is desired to restrict the longitudinal movement of the hopper, the pin 19 is removed from the upper aperture and the hopper lowered. This lowering of the hopper preventing too great a movement of the hopper 14. It will also be noted that the arms 11 may be secured at various points longitudinally of the hopper 14, thus further regulating the movement of said hopper.

Particular attention is called to the peculiar construction of the hopper 14 and the manner in which the same is bent inwardly to support the screen or riddle 16. The many advantages of a construction of this character will be clearly apparent as it will be noted that hopper 14 will not only be efficient in action but the same is of such construction as to be easily and cheaply manufactured Particular attention is called to the peculiar manner of adjustably supporting said hopper, said adjustment effectually regulating the movement of the hopper. It will be noted that the hopper 14 may be quickly and conveniently attached to the main hopper of the distributer, the operation of the hopper 14 in no way depending upon the peculiar construction of the main hopper. Attention is also called to the fact that the various adjustments of the hopper 14 do not require a special construction of lower hopper, the only addition to the lower hopper being the pivoted supported arms. While the hoppers are shown as rectangular in the drawings it will be noted that cylindrical hoppers may be used. It will be seen that these arms while permitting a movement of the hopper will restrict the movement of the hopper beyond a certain length this being of particular advantage in the event that the hopper 14 be placed in a main distributing hopper of a length which would prevent the end portions of the hopper 14 from contacting with the inner surfaces of the end portions of the main hopper. Attention is called to the peculiar manner of supporting the riddle 16, the supporting structure being an integral part of the hopper. This construction, while not greatly adding to the expense of the manufacture of the hopper being a great saving of material.

What is claimed is:

1. A fertilizer distributer comprising a main hopper, a second hopper pivotally supported above the first mentioned hopper, a screen arranged within said second hopper, and means for adjusting said second hopper.

2. A fertilizer distributer comprising a plurality of hoppers one arranged within the other, the outer hopper restricting the longitudinal movement of the inner hopper, a screen supported by said hopper, and means for adjusting said inner hopper to vary such movement.

3. A fertilizer distributer consisting of a plurality of hoppers, one of said hoppers being arranged above the other, the upper hopper extending within the first mentioned hopper, a screen supported by said upper hopper, and means for vertically adjusting said upper hopper.

4. A fertilizer distributer comprising a plurality of hoppers, one of said hoppers being arranged above the other, the discharge end of the upper hopper extending within the lower hopper, a screen supported by said upper hopper, arms secured to the lower hopper, said arms pivotally supporting the upper hopper, and means for vertically adjusting said upper hopper.

5. A fertilizer distributer comprising a plurality of hoppers, one of said hoppers being arranged above the other, the discharge end of the upper hopper extending within the lower hopper, and means for vertically adjusting said hopper to vary its movements.

6. A fertilizer distributer comprising a plurality of hoppers, one of said hoppers being arranged above the other, the discharge end of the upper hopper extending within the lower hopper, a screen supported by said upper hopper, a plurality of arms pivotally supported by the lower hopper, said arms pivotally supporting the upper hopper, and restricting the longitudinal movement of the same.

7. A fertilizer distributer comprising a plurality of hoppers, one of said hoppers being arranged above the other, the discharge end of the upper hopper extending within the lower hopper, a screen supported by said upper hopper, a plurality of arms pivotally supported by the lower hopper, said arms pivotally supporting the upper hopper, and restricting the longitudinal movement of said upper hopper, and means for adjusting said upper hopper on said arms.

8. A fertilizer distributer comprising a main hopper, a second hopper, the discharge end of said second hopper extending within the first mentioned hopper, said second hopper being formed with an inwardly extending flange, and a screen supported by said flange.

In testimony that I claim the foregoing as my own, I have hereto affixed my signature in the presence of two witnesses.

WALTER RANSOM GRAVES.

Witnesses:
  J. G. KIRBY,
  L. F. KIRBY.

Copies of this patent may be obtained for five cents each, by addressing the "Commissioner of Patents, Washington, D. C."